(12) United States Patent
Zafar et al.

(10) Patent No.: US 10,075,455 B2
(45) Date of Patent: Sep. 11, 2018

(54) ZERO-DAY ROTATING GUEST IMAGE PROFILE

(71) Applicant: FireEye, Inc., Milpitas, CA (US)

(72) Inventors: Asim Zafar, Punjab (PK); Eirij Qureshi, Lahore (PK); Darien Kindlund, Great Falls, VA (US)

(73) Assignee: FireEye, Inc., Milpitas, CA (US)

( * ) Notice: Subject to any disclaimer, the term of this patent is extended or adjusted under 35 U.S.C. 154(b) by 112 days.

(21) Appl. No.: 14/788,450

(22) Filed: Jun. 30, 2015

(65) Prior Publication Data

US 2016/0191547 A1 Jun. 30, 2016

(30) Foreign Application Priority Data

Dec. 26, 2014 (PK) .................................... 914/2014

(51) Int. Cl.
G06F 21/55 (2013.01)
H04L 29/06 (2006.01)
(Continued)

(52) U.S. Cl.
CPC ...... H04L 63/1416 (2013.01); G06F 9/45558 (2013.01); G06F 21/53 (2013.01);
(Continued)

(58) Field of Classification Search
CPC . H04L 63/1416; H04L 63/1425; G06F 21/53; G06F 21/552; G06F 9/45558;
(Continued)

(56) References Cited

U.S. PATENT DOCUMENTS 4,292,580 A 9/1981 Ott et al.
5,175,732 A 12/1992 Hendel et al.
(Continued)

FOREIGN PATENT DOCUMENTS

GB 2439806 A 1/2008
GB 2490431 A 10/2012
(Continued)

OTHER PUBLICATIONS

Marchette, David J., Computer Intrusion Detection and Network Monitoring: A Statistical ("Marchette"), (2001).
(Continued)

*Primary Examiner* — Meng Li
(74) *Attorney, Agent, or Firm* — Rutan & Tucker, LLP

(57) ABSTRACT

According to one embodiment, a threat detection platform features a housing, a communication interface, a processor coupled to the communication interface, and a data store. The data store includes (i) an event log, (ii) a first virtual machine, and (iii) a second virtual machine. The first virtual machine is provisioned with a first guest image that is based on an instrumented software profile that includes a first software component and activity monitors configured for the first software component. The second virtual machine is provisioned with a second guest image that is based on a temporary software profile that includes a second software component that is a more recent version of the first software component and the activity monitors configured for the first software component.

32 Claims, 6 Drawing Sheets

(51) Int. Cl.
*G06F 9/455* (2018.01)
*G06F 21/53* (2013.01)

(52) U.S. Cl.
CPC ........ *G06F 21/552* (2013.01); *H04L 63/1425* (2013.01); *G06F 2009/4557* (2013.01); *G06F 2009/45562* (2013.01); *G06F 2009/45587* (2013.01); *G06F 2009/45591* (2013.01); *G06F 2221/033* (2013.01)

(58) Field of Classification Search
CPC ..... G06F 2221/033; G06F 2009/45562; G06F 2009/45587; G06F 2009/4557; G06F 2009/45591
See application file for complete search history.

(56) References Cited

U.S. PATENT DOCUMENTS

| | | | |
|---|---|---|---|
| 5,440,723 A | 8/1995 | Arnold et al. |
| 5,490,249 A | 2/1996 | Miller |
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |
| 6,108,799 A | 8/2000 | Boulay et al. |
| 6,118,382 A | 9/2000 | Hibbs et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | S.o slashed.rhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B2 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,072 B2 | 6/2012 | Matulic |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,198 B2 | 10/2012 | Mott et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |

(56) References Cited

U.S. PATENT DOCUMENTS

| | | |
|---|---|---|
| 8,321,240 B2 | 11/2012 | Lorsch |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,959,428 B2 | 2/2015 | Majidian |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,282,109 B1 | 3/2016 | Aziz et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |

(56) References Cited

U.S. PATENT DOCUMENTS

| | | |
|---|---|---|
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0190561 A1 | 8/2006 | Conboy et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | Fitzgerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1* | 9/2007 | Wang ............... H04L 63/1416 709/217 |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192057 A1 | 7/2010 | Majidian |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0275210 A1 | 10/2010 | Phillips et al. |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |

(56) References Cited

U.S. PATENT DOCUMENTS

| | | |
|---|---|---|
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173178 A1 | 7/2011 | Conboy et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0304244 A1* | 11/2012 | Xie .................. G06F 21/00 726/1 |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0276112 A1* | 10/2013 | Dalcher ............ H04L 63/1425 726/23 |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0181975 A1* | 6/2014 | Spernow ............ G06F 21/562 726/23 |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0325344 A1 | 10/2014 | Bourke et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1* | 4/2015 | Vincent ............ G06F 21/566 726/23 |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0220735 A1 | 8/2015 | Paithane et al. |
| 2015/0372980 A1 | 12/2015 | Eyada |
| 2016/0044000 A1 | 2/2016 | Cunningham |
| 2016/0127393 A1 | 5/2016 | Aziz et al. |

FOREIGN PATENT DOCUMENTS

| | | |
|---|---|---|
| WO | 0223805 A2 | 3/2002 |
| WO | 0206928 | 11/2003 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

Margolis, P.E., "Random House Webster's 'Computer & Internet Dictionary 3rd Edition", ISBN 0375703519, (Dec. 1998).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

(56) References Cited

OTHER PUBLICATIONS

Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Newsome, J., et al., "Polygraph: Automatically Generating Signatures for Polymorphic Worms", In Proceedings of the IEEE Symposium on Security and Privacy, (May 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
Peter M. Chen, and Brian D. Noble, "When Virtual Is Better Than Real, Department of Electrical Engineering and Computer Science", University of Michigan ("Chen").
Reiner Sailer, Enriquillo Valdez, Trent Jaeger, Roonald Perez, Leendert van Doorn, John Linwood Griffin, Stefan Berger., sHype: Secure Hypervisor Approach to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Spitzner, Lance, "Honeypots: Tracking Hackers", ("Spizner"), (Sep. 17, 2002).
The Sniffers's Guide to Raw Traffic available at: yuba.stanford.edu/~casado/pcap/sectionl.html, (Jan. 6, 2014).
Thomas H. Ptacek, and Timothy N. Newsham, "Insertion, Evasion, and Denial of Service: Eluding Network Intrusion Detection", Secure Networks, ("Ptacek"), (Jan. 1998).
U.S. Appl. No. 11/717,475, filed Mar. 12, 2007 Final Office Action dated Feb. 27, 2013.
U.S. Appl. No. 11/717,475, filed Mar. 12, 2007 Final Office Action dated Nov. 22, 2010.
U.S. Appl. No. 11/717,475, filed Mar. 12, 2007 Non-Final Office Action dated Aug. 28, 2012.
U.S. Appl. No. 11/717,475, filed Mar. 12, 2007 Non-Final Office Action dated May 6, 2010.
U.S. Appl. No. 14/059,381, filed Oct. 21, 2013 Non-Final Office Action dated Oct. 29, 2014.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul, "NetDetector Captures Intrusions", InfoWorld Issue 27, ("Venezia"), (Jul. 14, 2003).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Mathew M., "Throttling Virses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.
Bowen, B. M. et al "BotSwindler: Tamper Resistant Injection of Believable Decoys in VM-Based Hosts for Crimeware Detection", in Recent Advances in Intrusion Detection, Springer ISBN: 978-3-642-15511-6 (pp. 118-137) (Sep. 15, 2010).
PCT/US2014/043126 filed Jun. 23, 2014 International Search Report and Written Opinion dated Oct. 9, 2014.
PCT/US2015/067082 filed Dec. 21, 2015 International Search Report and Written Opinion dated Feb. 24, 2016.
U.S. Appl. No. 13/925,688, filed Jun. 24, 2013 Final Office Action dated Jan. 12, 2017.
U.S. Appl. No. 13/925,688, filed Jun. 24, 2013 Final Office Action dated Mar. 11, 2016.
U.S. Appl. No. 13/925,688, filed Jun. 24, 2013 Non-Final Office Action dated Jun. 2, 2015.
U.S. Appl. No. 13/925,688, filed Jun. 24, 2013 Non-Final Office Action dated Sep. 16, 2016.
"Network Security: NetDetector—Network Intrusion Forensic System (NIFS) Whitepaper", ("NetDetector Whitepaper"), (2003).
"Packet", Microsoft Computer Dictionary Microsoft Press, (Mar. 2002), 1 page.
"'When Virtual is Better Than Real", IEEEXplore Digital Library, available at, http://ieeexplore.ieee.org/xpl/articleDetails.jso?reload=true&arnumber=990073, (Dec. 7, 2013).
Abdullah, et al., Visualizing Network Data for Intrusion Detection, 2005 IEEE Workshop on Information Assurance and Security, pp. 100-108,
Adetoye, Adedayo, et al., "Network Intrusion Detection & Response System", ("Adetoye") (Sep. 2003).
Adobe Systems Incorporated, "PDF 32000-1:2008, Document management—Portable document format—Part1:PDF 1.7", First Edition, Jul. 1, 2008, 756 pages.
AltaVista Advanced Search Results. "attack vector identifier" Http://www.altavista.com/web/results?Itag=ody&pg=aq&aqmode=aqa=Event+Orchestrator . . . , (Accessed on Sep. 15, 2009).
AltaVista Advanced Search Results. "Event Orchestrator". Http://www.altavista.com/web/results?Itag=ody&pg=aq&aqmode=aqa=Event+Orchesrator . . . , (Accessed on Sep. 3, 2009).
Apostolopoulos, George; hassapis, Constantinos; "V-eM: a cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Aziz, Ashar, System and Method for Malware Containment, U.S. Appl. No. 14/620,060, filed Feb. 11, 2015, non-Final Office Action dated Apr. 3, 2015.
Baecher, "The Nepenthes Platform: An Efficient Approach to collect Malware", Springer-verlaq Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists.org, Honeypots mailing list archives", available at http://seclists,org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Cisco "Intrusion Prevention for the Cisco ASA 5500-x Series" Data Sheet (2012).
Cisco, Configuring the Catalyst Switched Port Analyzer (SPAN) ("Cisco"), (1992-2003).

(56) References Cited

OTHER PUBLICATIONS

Clark, John, Sylvian Leblanc,and Scott Knight. "Risks associated with usb hardware trojan devices used by insiders." Systems Conference (SysCon), 2011 IEEE International. IEEE, 2011.
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05 Association for Computing Machinery, Inc., Brighton U.K., (Oct. 23-26, 2005).
Crandall, J. R., et al., "Minos:Control Data Attack Prevention Orthogonal to Memory Model", 37th International Symposium on Microarchitecture, Portland, Oregon, (Dec. 2004).
Deutsch, P., ""Zlib compressed data format specification version 3.3" RFC 1950, (1996)".
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric , et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review vol. 42 Issue 3, pp. 21-28.
Gregg Keizer: "Microsoft's HoneyMonkeys Show Patching Windows Works", Aug. 8, 2005, XP055143386, Retrieved from the Internet: URL:https://web.archive.org/web/20121022220617/http://www.informationweek- .com/microsofts-honeymonkeys-show-patching-wi/167600716 [retrieved on Sep. 29, 2014].
Heng Yin et al, Panorama: Capturing System-Wide Information Flow for Malware Detection and Analysis, Research Showcase @ CMU, Carnegie Mellon University, 2007.
Hjelmvik, Erik, "Passive Network Security Analysis with NetworkMiner", (IN)SECURE, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField=Score&SortOrder=desc&ResultC . . . (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King").
Krasnyansky, Max, et al., Universal TUN/TAP driver, available at https://www.kernel.org/doc/Documentation/networking/tuntap.txt (2002) ("Krasnyansky").
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Liljenstam, Michael, et al., "Simulating Realistic Network Traffic for Worm Warning System Design and Testing", Institute for Security Technology studies, Dartmouth College, ("Liljenstam"), (Oct. 27, 2003).
Lindorter, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].

\* cited by examiner

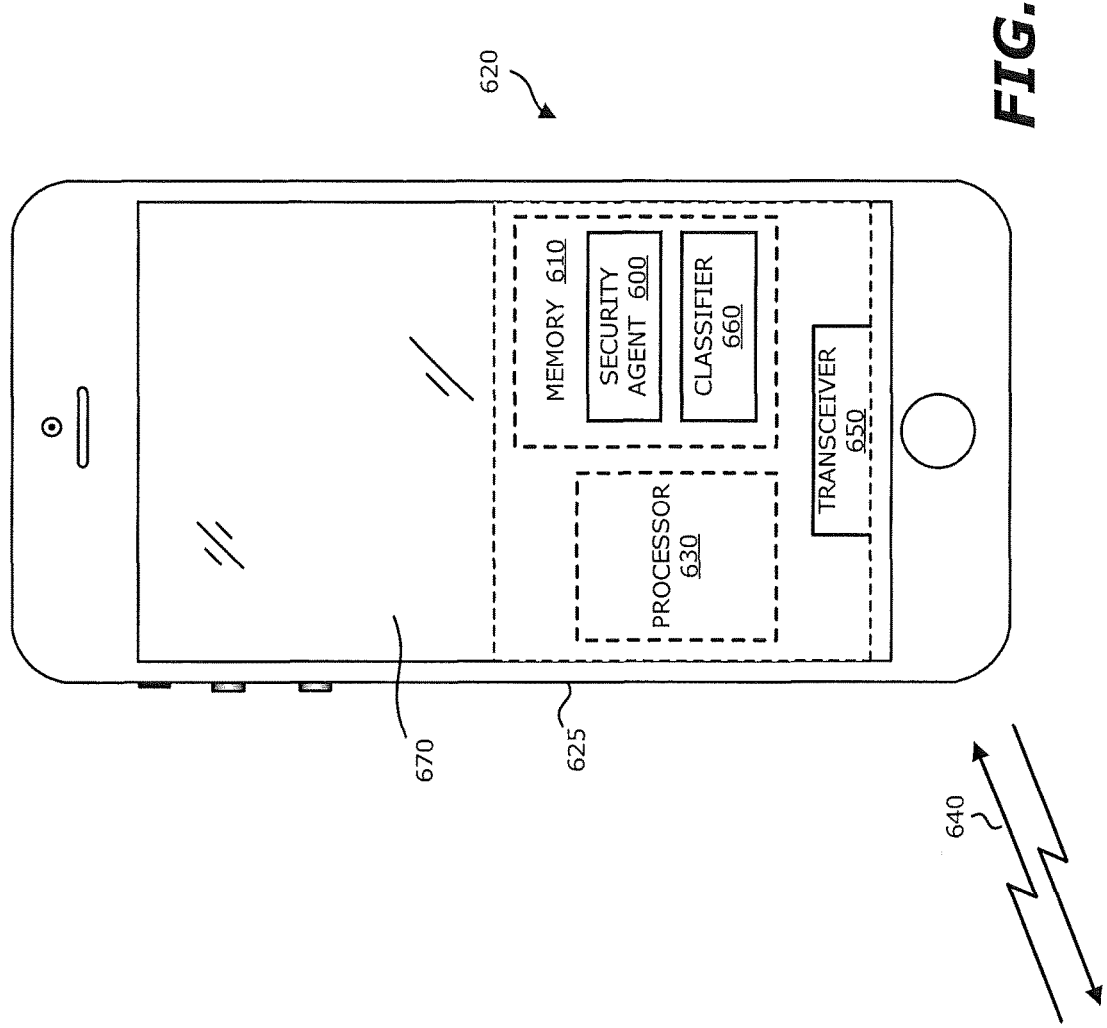

ZERO-DAY ROTATING GUEST IMAGE PROFILE

FIELD

Embodiments of the disclosure relate to the field of cyber security. More specifically, embodiments of the disclosure relate to a system and method for detecting malicious attacks through virtual processing of a suspect object in accordance with multiple virtual environments.

GENERAL BACKGROUND

Malware detection systems often employ virtual environments to enable potentially malicious objects to be safely analyzed during run-time in one or more sandboxed virtual machines. Each virtual machine is provisioned with a guest image, where the guest image is configured in accordance with a particular software profile. This particular software profile is dependent on the type of object being analyzed. For example, where the object is a web page, the software profile may prescribe a browser application that runs over a specific operating system (e.g., Windows®, Linux®, etc.). As another example, where the object is an electronic message, the software profile may prescribe an email application running over the same or a different operating system (e.g., Microsoft® Mobile®, Blackberry® OS, etc.). The applications and operating systems may be generally referred to as software components, and may differ from one another by software vendor or version number.

For processing a suspect object, the virtual machine is provisioned with a guest image that features software components for the prescribed software profile. A virtual execution (run-time) environment features the virtual machine along with "activity monitors," namely software components that are configured to observe and capture run-time behavior of the suspect object during processing within the virtual machine. For example, the activity monitors may be operationally situated to intercept software calls (e.g., function or system calls) made by a software component running in the virtual machine. The configuring of the activity monitors is highly dependent on the type and sometimes the version of the software component.

The process in developing activity monitors appropriate for certain software components is sometimes referred to as "instrumenting" the software profile. In this regard, instrumentation refers to the ability of a malware detection system to monitor and capture activities during run-time of the object, including both expected and unexpected activities, in order to use these captured activities in classifying the object as malicious or non-malicious (e.g., benign). Such instrumentation does not require monitoring of all functionality, but rather, the monitoring of functionality associated with an attack (or likely to give rise to indicators of compromise).

As new software components or new versions of currently supported software components are released by the software vendors, new instrumented software profiles need to be developed and tested for these software components. The completion of a fully-instrumented software profile may often require months of development and testing in order to ensure that the activity monitors appropriately capture at least certain predetermined activities associated with malware.

Given the amount of time necessary to complete a fully-instrumented software profile, malware authors generally have a window of time to develop and deploy new malware that exploits certain unknown vulnerabilities of a newly released software component, namely the period of time between release of the software component and deployment of a guest image configured to accordance with a new, fully-instrumented software profile. Such new malware represents zero-day exploits, that is, malware that exploits a vulnerability that has not been detected previously. Malware detection systems and their instrumented legacy software profiles typically are inadequate in capturing many of the activities caused by zero-day malware, and thus, may fall short in classifying an object as malicious. Of course, conventional anti-virus scanning programs are likely to be totally ineffectual in detecting zero-day exploits since new and sophisticated malware will not correspond to known malware signatures.

BRIEF DESCRIPTION OF THE DRAWINGS

Embodiments of the invention are illustrated by way of example and not by way of limitation in the figures of the accompanying drawings, in which like references indicate similar elements and in which:

FIG. 6 is an exemplary embodiment of an endpoint device operating in accordance with the rotating guest image scheme.

DETAILED DESCRIPTION

Figure 1:
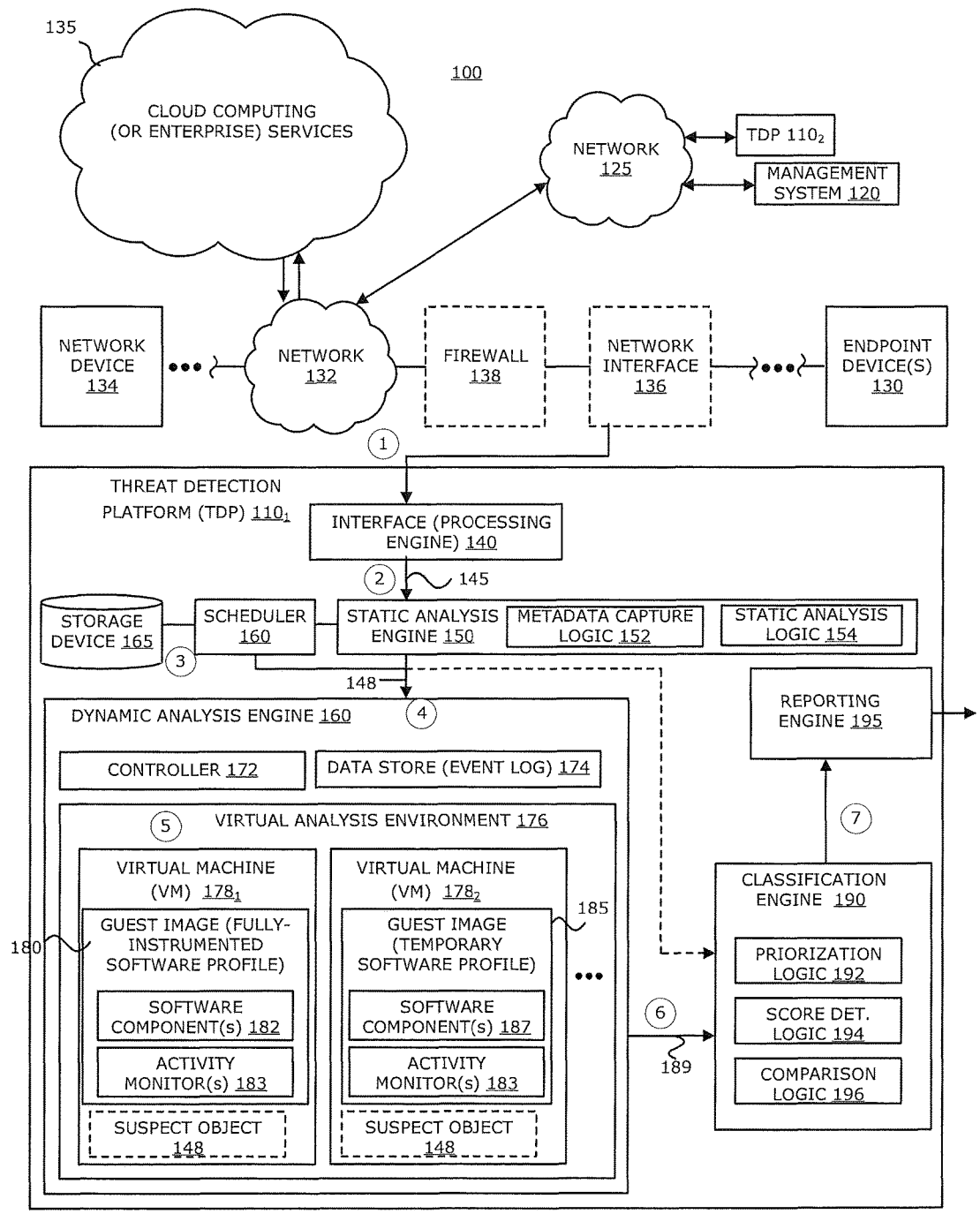
FIG. 1 is a first exemplary block diagram of a threat detection platform (TDP) operating in accordance with an rotating guest image scheme as described herein.

Various embodiments of the disclosure relate to a system and method for detecting malicious attacks, especially zero-day attack exploits, through virtual processing of a suspect object in accordance with collective operations of multiple sandboxed virtual environments. According to one embodiment of the disclosure, a first virtual environment is provisioned with a first guest image that is based on an instrumented, legacy software profile, normally the most recent, fully instrumented software profile. A second virtual environment is provisioned with a second guest image that is based on a temporary software profile. This "temporary software profile" is not fully-instrumented, as it relies on legacy activity monitors.

In order words, the temporary software profile may feature the most recent version of a particular software component (e.g., new version of a browser application, new version of portable document format "PDF" reader, etc.), but relies on activity monitors generated for a legacy software profile developed for a prior version of the software component. As described, the activity monitors may be situated within the guest image (e.g., within the software component itself) or external to the software component though within the guest image (e.g., as a separate process inter-operable, directly or indirectly, with the computer program or its programmatic interfaces to intercept such activities). Alternatively, the activity monitors may be situated external to the guest image, such as being situated within a virtual memory manager (VMM) sometimes referred to as a "hypervisor".

As an illustrative example, the system may be deployed as a threat detection platform that performs malware detection based on concurrent analysis during run-time in one or more sandboxed virtual environments (e.g., one or more virtual machines). According to one embodiment of the disclosure, subsequent to release of a new version of a software component (e.g., "software 2.0" that is a newer version of "software 1.5"), a virtual analysis environment of the threat detection platform comprises a first virtual machine that is provisioned with a first guest image. The first guest image is configured in accordance with a fully-instrumented, legacy software profile, such as software 1.5 and activity monitors developed for software 1.5. Additionally, the virtual analysis environment of the threat detection platform comprises a second virtual machine that is provisioned with a second guest image. The second guest image is configured with a non-instrumented (temporary) software profile, such as software 2.0 and some or all of the legacy activity monitors developed for software 1.5.

Stated differently, the analysis environment may feature a first virtual environment provisioned with a first guest image including a first version of the software component (software 1.5) and a complete activity monitor package. The "complete" activity monitor package includes a first set of activity monitors for the first version of the software component (software 1.5), where the first set of activity monitors have been tested and provide comprehensive analysis of operations specific to the first version of the software component. Additionally, a second virtual environment may be provisioned with a second guest image that includes a second version of the software component (software 2.0) different than the first version of the software component (software 1.5) and a partial activity monitor package. As one example, the partial activity monitor package initially comprises the first set of activity monitors used for the first virtual environment and are directed specifically to the first version of the software component. Over time, the partial activity monitor package is updated, where the updates may include (1) one or more activity monitors that are specifically directed to either (a) a subset of new functionality provided by the second version of software component and absent from the first version of the software component or (b) modifications to one or more of the activity monitors of the first set of activity monitors that are used by the first version of the software component or (2) one or more activity monitors used for the first virtual environment and one or more activity monitors that are directed to, at most, only some of functionality provided by the second version of the software component that is not provided by the first version of the software component.

More specifically, in order to mitigate the likelihood of false negative events in detecting zero-day exploits, upon detecting availability of a new version (or any update) of a software component, the temporary software profile is generated. The temporary software profile includes the new version of the software component (software 2.0) along with some or all of the activity monitors that are directed to an earlier version of that software component (software 1.5). In conducting dynamic analysis of the suspect object, the second virtual machine is provisioned with the second guest image, which includes the new version of the software component along with activity monitors that are directed to an earlier version of that software component while the first virtual machine is provisioned with a guest image that includes the same or an earlier version of the software component along with activity monitors specifically generated for that version of the software component.

Hence, during dynamic analysis, the suspect object may undergo processing by at least two virtual machines requiring that software component. Additionally, activity monitors appropriate to that new version of the software component may be subsequently developed and tested, where updates of the temporary software profile may cause new guest images to be generated and the second virtual machine to be continuously reconfigured for each new update when instrumenting the temporary software profile.

Of course, in lieu of multiple virtual machines, a single virtual machine may be provisioned to operate in accordance with both the fully-instrumented, legacy software profile and the temporary software profile. This embodiment is especially available when the differences between fully-instrumented legacy software profile and the temporary software profile is solely based on the new version of a software application, namely no changes to OS functionality.

Also, in lieu of the software component usually being included (e.g. pre-stored on the platform), the software profile may be implemented with a script (or other type of logic) that is configured to fetch the software component from a source (e.g., software manufacturer, software distributor, etc.).

After configuration of the virtual analysis environment, the suspect object would be processed by at least one virtual machine, such as a plurality of virtual machines provisioned with guest images associated with different software profiles. For instance, a first virtual machine (VM) may be provisioned with a guest image that is based on a fully-instrumented, legacy software profile. Stated differently, the first VM may be loaded with software components associated with a fully-instrumented, legacy software profile. As a result, a second VM may be loaded with a temporary software profile, which prescribes the most recent version of one or more software components for the legacy software profile loaded in the first VM. The legacy software profile represents a catalog of software components instrumented to detect activities (e.g., exploits) within the virtual environment associated with the first VM. Each software profile may include software components (a) installed throughout an enterprise network to enable detection of malware that may successfully attack the enterprise (e.g., due to vulnerabilities in computer programs actually running within the enterprise), and/or (b) representing a selection of commonly deployed computer programs (e.g., to detect whether the object contains malware even if the enterprise itself may not be vulnerable).

By provisioning virtual environments with guest images pursuant to both the fully-instrumented legacy software profile and the temporary software profile as described above, the threat detection platform may still detect a variety of malicious attacks despite a lack of completion in generating the activity monitors for the new version of the software component. The differences in detection between the virtual environments may be analyzed to improve detection of zero-day exploits directed to vulnerabilities in the new version of the software component during the interim and further improve and perhaps expedite full instrumentation of the most recent version of the software component(s). This dual analysis continues as updates to the temporary software profile are received (e.g., incremental updates to the activity monitors associated with the new version of the software component) until the activity monitors for the new version of the software component are fully instrumented.

At that time, only the fully instrumented software profile for the new version of the software component is run.

These above-described operations that occur during instrumentation of the new version of the software component achieve an advantage in that more details of a potential attack are provided to enable more effective/accurate classification (e.g., malware type or family, zero day exploit, etc.). Furthermore, more information on the attack profile of such malware (e.g., for tracing or remediation purposes) may be learned.

In summary, the threat detection platform can thus establish virtual environments concurrently in either of two modes: (1) a first mode in which each instantiated virtual environment is provisioned with a guest image based on a fully-instrumented software profile that includes a complete (in the sense of both "developed and tested" and comprehensive) activity monitors; or (2) a second mode in which a first virtual environment is provisioned with a guest image based on a fully-instrumented, legacy software profile along with a second "shadow" virtual environment provisioned with a guest image based on a partially-instrumented software file that includes the most recent software component(s) but a partial activity monitor package. The "partial activity monitor package" may constitute the activity monitors used for the first virtual environment and/or one or more activity monitors that are directed to, at most, only some of the new functionality provided by the new version of the software component, for example. When operating in the second mode, the threat detection platform continues such operations until a fully instrumented (and tested) version of the activity monitor package is available and thereafter we provide that new graphic interface (GI) and associated monitor package as a most recent "fully-instrumented" guest image.

I. Terminology

In the following description, certain terminology is used to describe aspects of the invention. For example, in certain situations, both terms "component," "engine" and "logic" are representative of hardware, firmware and/or software that is configured to perform one or more functions. As hardware, engine (or component or logic) may include circuitry having data processing or storage functionality. Examples of such processing or storage circuitry may include, but is not limited or restricted to a processor; one or more processor cores; a programmable gate array; a microcontroller; an application specific integrated circuit; receiver, transmitter and/or transceiver circuitry; semiconductor memory; or combinatorial logic, or combinations of one or more of the above components.

Component (or engine or logic) may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device; and/or a semiconductor memory. As firmware, the executable code is stored in persistent storage.

The term "object" generally refers to a collection of data, such as a file, a portion of code, a message, a packet or a group of related packets for example, normally having a logical structure or organization that enables classification for purposes of analysis or storage. For instance, an object may be a self-contained element, where different types of such objects may include an executable file; a non-executable file (such as a document or a dynamically link library), a Portable Document Format (PDF) file, a JavaScript™ file, Zip™ file, a Flash file, a document (for example, a Microsoft Office® document); an email; downloaded web page; an instant message in accordance with Session Initiation Protocol (SIP) or another messaging protocol, or the like. Also, in a broader sense, an object may constitute a flow, namely a collection of related objects communicated during a single communication session (e.g., Transport Control Protocol "TCP" session), perhaps between two electronic devices.

A "platform" generally refers to an electronic device that includes a housing that protects, and sometimes encases, circuitry with data processing, storage functionality and/or network connectivity. Examples of a platform may include a server or an endpoint device that may include, but is not limited or restricted to a stationary or portable computer including a desktop computer, laptop, electronic reader, netbook or tablet; a smart phone; a video-game console; or wearable technology (e.g., watch phone, etc.).

A "virtual machine" generally refers to an operating system (OS) or application environment that is virtualized and imitates dedicated hardware of a device (abstract or real), which may be different from the device on which the simulation is conducted. Virtual machines may be based on specifications of a hypothetical computer or emulate the computer architecture and functions of a real world computing device.

A "message" generally refers to information transmitted as information in a prescribed format, where each message may be in the form of one or more packets or frames, a Hypertext Transfer Protocol (HTTP) based transmission, or any other series of bits having the prescribed format. "Metadata" is information that describes data (e.g., a particular object or objects constituting a flow, etc.).

The term "transmission medium" is a physical or logical communication path with an endpoint device. For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architectures and Methods of Operations

Referring to FIG. 1, an exemplary block diagram of a network 100 deploying a plurality of threat detection platforms (TDP) $110_1$-$110_N$ (N>1, where N=2 for this embodiment) communicatively coupled to a management system 120 via a network 125 is shown. In general, the management system 120 is adapted to manage each TDP $110_1$-$110_3$. For instance, the management system 120 may be configured to perform content updates (e.g., upload new rules or modified rules, delete rules, modify parameters that are utilized by the rules and/or upload metadata) within a static analysis engine 150, a dynamic analysis engine 170, a classification engine 190, and/or a reporting engine 195 with an optional user interface capability.

As shown in FIG. 1, a first threat detection platform (TDP) $110_1$ is an electronic device that is adapted to analyze information associated with incoming data (e.g., data over a communication network 132 from/to one or more endpoint devices 130, data via another type of transmission medium such as wireless channel from a dedicated server, wired cable coupled to a server or device with storage capability, etc.). As this illustrative embodiment, the communication network 132 may include a public network such as the Internet, a private network (e.g., a local area network "LAN", wireless LAN, etc.), or a combination thereof. Herein, the first TDP $110_1$ is communicatively coupled with the communication network 132 via an interface 136.

In general, the interface 136 may operate as a data capturing device that is configured to receive the incoming data and provide information associated with the received incoming data to the first TDP $110_1$. According to one embodiment of the disclosure, the interface 136 operates as a data capturing device (e.g., network tap) that provides at least one or more objects (hereinafter "object(s)") extracted from network traffic propagating to/from one or more endpoint devices 130 (hereinafter, "endpoint device(s)"). Alternatively, although not shown, the interface 136 may be configured to receive files or other objects that are not provided over a network. For instance, as an example, the interface 136 may be a data capturing device that automatically (or on command), accessing data stored in a storage system or another type of interface, such as a port, for receiving objects manually provided via a suitable dedicated communication link or from storage media such as portable flash drives.

Metadata may accompany the object(s) for analysis. According to one embodiment of the disclosure, the metadata may be used, at least in part, to determine protocols, application types and other information that identifies characteristics of the object under analysis. The metadata may be used by logic (e.g., scheduler 160) within the first TDP $110_1$ to select one or more software (guest) images that correspond to and include a particular software profile. The software images are used to provision virtual machines $178_1$-$178_M$ (M≥1) within virtual analysis environment 176 according to a particular software profile. For instance, accessible by the scheduler 160, a plurality of different types of software images may be stored in a storage device 165, which correspond to a plurality of different types of software profiles. The software images can be updated via the management system 120 and/or cloud computing (or enterprise) services under a "push" or "pull" delivery scheme. These software images are used for configuring (i) virtual machine(s) $178_1$-$178_M$ within a virtual analysis environment 176 of the dynamic analysis engine 160, or (ii) one or more security agents operating similarly to VMs and deployed within an endpoint device, as described below.

In some embodiments, although not shown, interface 136 may be contained within the first TDP $110_1$. In other embodiments, the interface 136 can be integrated into an intermediary device in the communication path (e.g., a firewall, router, switch or other networked electronic device) or can be a standalone component, such as an appropriate commercially available network tap.

As further shown in FIG. 1, a first embodiment of the first TDP $110_1$ includes a communication interface 140 featuring a processing engine, static analysis engine 150, scheduler 160, storage device 165, dynamic analysis engine 170, classification engine 190, and reporting engine 195. Herein, the processing engine 140 receives a flow that includes an object and converts that object into a format, as need or appropriate, on which deep scanning by the static analysis engine 150 can be applied (see operations 1 & 2). This conversion and scanning may involve decompression of the object, decompilation of the object, extraction of specific data associated with the object, and/or emulation of the extracted data (like Javascript).

The static analysis engine 150 may include one or more controllers (e.g., processing circuitry such as one or more processors) that features metadata capture logic 152 and static analysis logic 154. For example, the metadata capture logic 152 is responsible for extracting and/or generating metadata contained with and/or associated with incoming data (e.g., network traffic). The metadata may be identified as being associated with a particular object 145 under analysis, and is temporarily stored. Examples of types of the metadata may include, but are not restricted or limited to information associated with the object such as object type. For example, code is an example of an object type, which may be in the form of an executable file or code embedded into another type of object. This metadata may be subsequently used for configuring one or more VMs $178_1$-$178_M$ within the virtual analysis environment 176 for conducting a dynamic analysis of the object associated with that metadata.

In addition to, or in lieu of the metadata associated with the source of the object 145, it is contemplated that other types of metadata may be captured by metadata capture logic 152. For instance, these other types of metadata may include metadata associated with the destination targeted to receive the object 145. As examples, the metadata may include the device type for endpoint device 130, the Media Access Control (MAC) address of the endpoint device 130, the particular software configuration of the endpoint device 130, or the like.

Referring still to FIG. 1, the static analysis logic 154 includes one or more software modules that, when executed by the controller(s), analyzes features for one or more incoming objects 145, which may be a portion of network traffic according to this embodiment of the disclosure (see operation 2). Such analysis may involve a static analysis of the features of each object under analysis to determine whether the object 145 is "suspect," namely, namely there exists a certain level of likelihood that the object 145 is associated with malware. This static analysis may include one or more checks being conducted on the object without its execution.

Examples of the checks may include signature matching to conduct (a) exploit signature checks, which may be adapted to compare at least a portion of the object under analysis with one or more pre-stored exploit signatures (pre-configured and predetermined attack patterns) from signature database (not shown), and/or (b) vulnerability signature checks that may be adapted to uncover deviations in messaging practices (e.g., non-compliance in communication protocols, message formats or ordering, and/or payload parameters including size). Other examples of these checks may include (i) heuristics, which is based on rules or policies as applied to the object and may determine whether one or more portions of the object under analysis is associated with an anomalous or suspicious characteristic (e.g., a particular URL associated with known exploits, or a particular source or destination address etc.) associated with known exploits; or (ii) determinative rule-based analysis that may include blacklist or whitelist checking.

Upon static analysis of the features of the object 145, the static analysis engine 150 determines whether this object 145 is "suspect," namely the object 145 has features that suggest its association with a malicious attack. As a result, the static analysis engine 150 may route this suspect object 148 (e.g., some or the entire analyzed object 145) to the dynamic analysis engine 170 for more in-depth analysis in the virtual analysis environment 176.

More specifically, after analysis of the features of the object 145 has been completed, the static analysis engine 150 may provide the suspect object 148 to the dynamic analysis engine 170 for in-depth dynamic analysis by at least VMs $178_1$-$178_2$ of the virtual analysis environment 176 (see operation 4). For instance, in accordance with the metadata associated with the suspect object 148, a first VM $178_1$ may be provisioned with a first guest image 180, which is configured with the latest, fully-instrumented software profile corresponding to characteristics of the suspect object 148. As shown, the first guest image 180 includes one or more software components 182 that are configured to process the suspect object 148 within the virtual analysis environment 176 and activity monitors 183 that are configured to monitor behaviors of the software component 182 when processing the suspect object 148. These behaviors may include certain activities, sequence of activities and/or inactivity, or other behaviors representative for this particular software component 182.

Concurrently, a second VM $178_2$ may be provisioned with a second guest image 185, which includes a software component 187 and the activity monitors 183. The software component 187 is the most recent version of software that is configured to process the suspect object 148 within the virtual analysis environment 176. The activity monitors 183 are not configured for the most recent version of the software that is configured to process the suspect object 148. Rather, the activity monitors 183 are configured to monitor behaviors of the software component 182 when processing the suspect object 148 instead of suspect component 187.

For instance, presuming that the suspect object 148 is directed to a particular type and version of the software component 182, such as a particular web browser application as in the Mozilla® FireFox® browser application for example, the first VM $178_1$ may be provisioned with the guest image 180 that is configured with the fully-instrumented software profile for that particular software component (e.g., Mozilla® FireFox® version 32.0 released in July 2014). By being fully-instrumented, activity monitors 183 have been developed specifically directed to all functionality of the software component 182 in order to monitor behaviors some of which may be unique for this particular type/version of software component, or target known vulnerabilities of that version.

Additionally, the second VM $178_2$ may be provisioned with the guest image 185, which is configured with the temporary software profile. Herein, the temporary software profile is directed to the same type of software but a different version (e.g., a later release of the web browser such as Mozilla® FireFox® version 33.0 released in September 2014). Also, the activity monitors associated with this version of the software component 187 have not been completed, and thus, some or all of the activity monitors 183 associated with the prior version (e.g., Mozilla® FireFox® version 32.0) are utilized. As a result, behaviors associated with common shared functions may be detected by the activity monitors 183, but behaviors associated with newly developed functions within the software component 187 may not be detected unless the activity monitors 183 detect calls and other programmatic activity that may be employed by malware attacking the new version of the software component 187, even if that malware is exploiting zero day vulnerabilities of this new version. In that case, the legacy activity monitors 183 may detect attacks against the software component 187 which would not have been launched or been successful against the prior software component 182 since that component did not have the same vulnerability as the later version.

Referring still to FIG. 1, according to one embodiment, the scheduler 160 may be adapted to configure one or more VMs $178_1$-$178_M$, namely the first VM $178_1$ and the second VM $178_2$ as shown, based on metadata associated with the suspect object 148 (see operation 3). For instance, the VMs $178_1$-$178_M$ may be provisioned with software images stored within the storage device 165. These software images are configured with in accordance with certain software profiles. The software profiles may be directed to software components supplied by an enterprise and/or software components commonly utilized by endpoint devices within the enterprise (e.g., a Windows® 7 OS; a certain version of a particular web browser such as Internet Explorer®; Adobe® PDF™ reader application). As yet another alternative embodiment, the software image may include a script that fetches the software components from a third party (e.g., software manufacturer, distributor, etc.). Of course, it is contemplated that the VM configuration described above may be handled by logic other than the scheduler 160.

According to one embodiment of the disclosure, the dynamic analysis engine 170 may be adapted to execute one or more VMs $178_1$-$178_M$, namely the first VM $178_1$ and the second VM $178_2$ as shown, that simulate processing of the suspect object 148 within a run-time environment (see operation 4). For instance, dynamic analysis engine 170 may optionally include processing logic 172 to emulate and provide anticipated signaling to the VM(s) $178_1$, . . . , and/or $178_M$ during virtual processing. As an example, the processing logic 172 may be adapted operate by simulating return signaling requested by the suspect object 148 during virtual run-time. The monitored behavior by the VMs $178_1$-$178_M$ may be stored within a data store (event log) 174 for subsequent transfer as part of the VM-based results 189 to the classification engine 190 (see operation 6).

According to one embodiment of the disclosure, the classification engine 190 includes logic that is configured to receive the VM-based result 189. Based on the VM-based results 189, which include information associated with the monitored behaviors associated with processing of the suspect object with the VMs $178_1$-$178_M$, the classification engine 190 classifies the suspect object 148 as malicious or not. According to one embodiment of the disclosure, the classification engine 190 comprises prioritization logic 192, score determination logic 194, and comparison logic 196. The optional prioritization logic 192 may be configured to apply weighting to analysis results from static analysis engine 150 (illustrated by dashed lines) and/or the VM-based results 189, especially where the VM-based results 189 include a preliminary score identifying a likelihood of the suspect object 148 being maliciousness.

The score determination logic 194 comprises one or more software modules that are used to determine a final probability (score) that is used by the comparison logic 196 to determine (i) whether the suspect object 148 is associated with a malicious attack, (ii) severity of the malicious attack, (iii) malware family pertaining to the malicious attack or "zero day" characteristics, or the like. The final probability (score) may be included as part of results provided to the reporting engine 195 for reporting. The score determination logic 194 may rely on a predictive model to determine the final probability (score) assigned to the suspect object 148.

As shown in FIG. 1, the reporting engine 195 is adapted to receive information from the classification engine 180 and generate alerts (e.g., various types of messages including text messages and email messages, display images, or other types of information over a wired or wireless communication path) that identify to a network administrator that the suspect object 148 as malicious (see operation 7).

Figure 2:
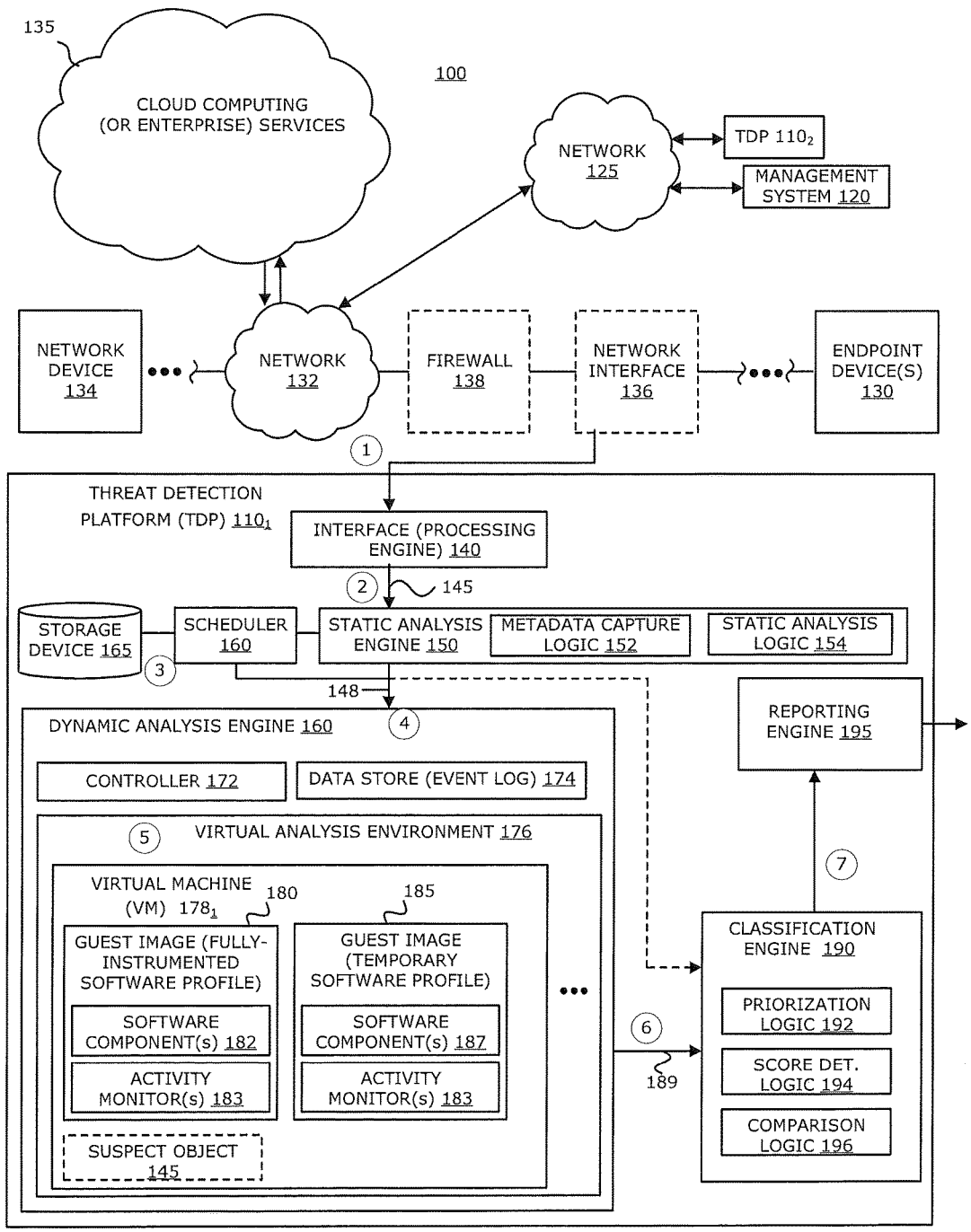
FIG. 2 is a second exemplary block diagram of a threat detection platform (TDP) operating in accordance with the rotating guest image scheme as described herein.

Referring to FIG. 2, an exemplary block diagram of a network 200 deploying a plurality of TDP $110_1$-$110_N$, including a second embodiment of the first TDP $110_1$, is shown. The first TDP $110_1$ includes the communication interface 140, the static analysis engine 150, the scheduler 160, the storage device 165, the dynamic analysis engine 170, the classification engine 190, and the reporting engine 195, as described above. However, in lieu of configuring the virtual analysis environment 176 with multiple virtual machines, a single virtual machine (e.g., first VM $178_1$) may be provisioned to operate in accordance with both the fully-instrumented, legacy software profile and the temporary software profile. These operations may be concurrent (e.g., occurring at least partially at the same time) or in series. As an example, this configuration may occur in response to a release of a new version of software (e.g. software 1.5.1), which is a minor update from a prior version (e.g., software 2.0) and relies on the same OS.

More specifically, in accordance with this embodiment, the first VM $178_1$ may be provisioned with both the first guest image 180 and the second guest image 185. The first guest image 180 is configured with the latest, fully-instrumented software profile corresponding to characteristics of the suspect object 148. As shown, the first guest image 180 includes one or more software components 182 that are configured to process the suspect object 148 within the virtual analysis environment 176 and activity monitors 183 that are configured to monitor behaviors of the software component 182 when processing the suspect object 148.

Additionally, the first VM $178_1$ is provisioned with the second guest image 185, which includes the software component 187 and the activity monitors 183. The software component 187 is the most recent version of that software. The activity monitors 183 are not configured for the most recent version of the software, but may be used to monitor much (but perhaps not all) of the functionality associated with the software component 187.

After configuration of the virtual analysis environment, the suspect object 148 would be processed, in a concurrent or sequential manner, by the first VM $178_1$. Herein, the differences in detection between the virtual environments associated with the fully-instrumented software profile and the temporary software profile may be analyzed to detect whether the subject object 148 constitutes a zero-day exploit and further improve and perhaps expedite full instrumentation of the most recent version of the software.

Figure 3:
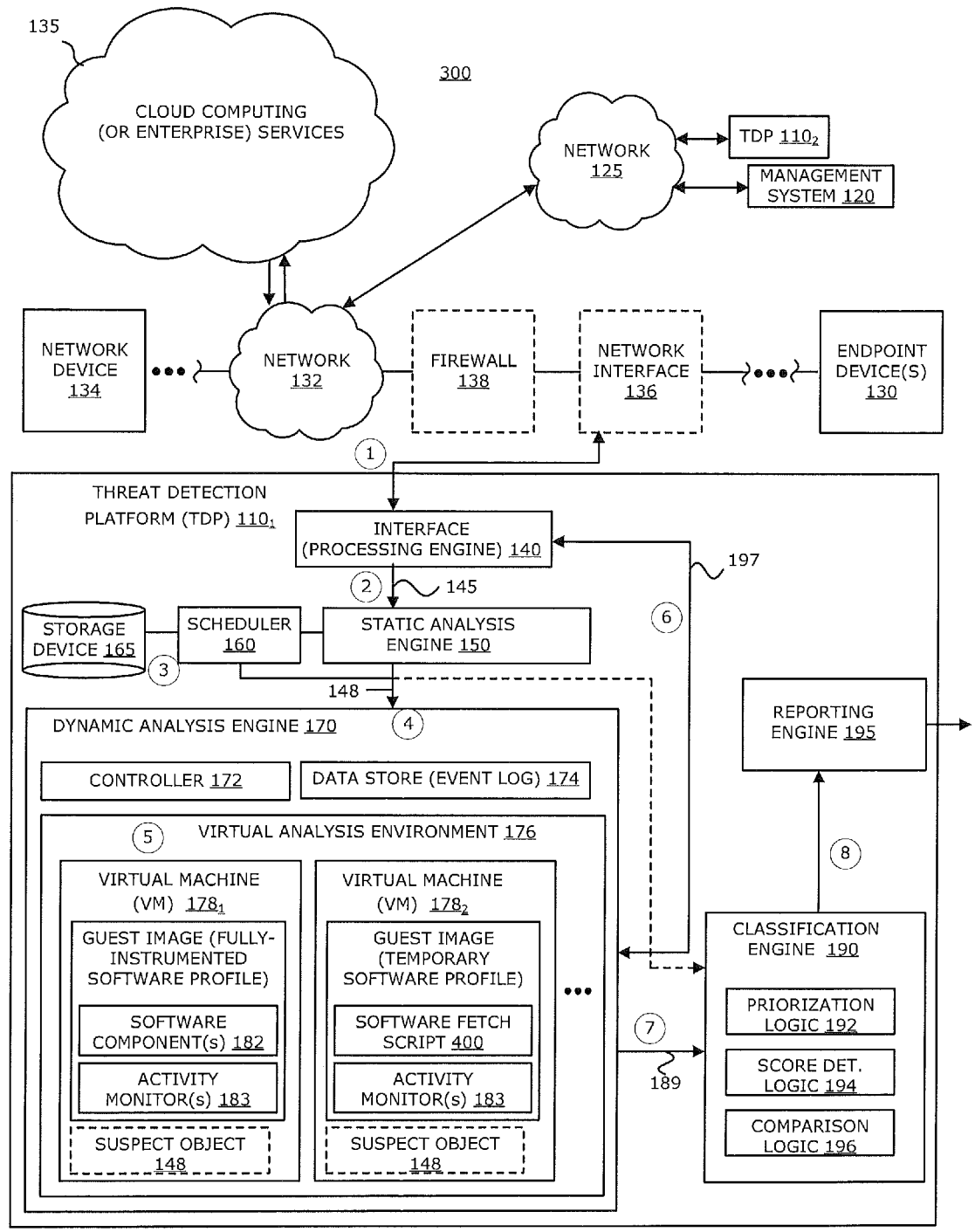
FIG. 3 is a third exemplary block diagram of a threat detection platform (TDP) operating in accordance with the rotating guest image scheme as described herein.

Referring to FIG. 3, an exemplary block diagram of a network 300 deploying the plurality of TDP $110_1$-$110_N$, including a third embodiment of the first TDP $110_1$, is shown. The first TDP $110_1$ includes the communication interface 140, the static analysis engine 150, the scheduler 160, the storage device 165, the dynamic analysis engine 170, the classification engine 190, and the reporting engine 195, as described above.

Herein, the first VM $178_1$ may be provisioned with the first guest image 180, which is configured with the latest, fully-instrumented software profile corresponding to characteristics of the suspect object 148. As shown, the first guest image 180 includes one or more software components 182 that are configured to process the suspect object 148 within the virtual analysis environment 176 and activity monitors 183 that are configured to monitor behaviors of the software component 182 when processing the suspect object 148. However, in lieu of including the software component 187, the second guest image 185 is configured with the temporary software profile that includes a script 310. The script 310, when executed by the second VM $178_2$, is configured to fetch the software component from a source (e.g., software manufacturer, software distributor, etc.) as shown by operation 6 identified as communication 197 for this embodiment. For instance, the script 310 may be configured to fetch a most recent version of Adobe® Reader® software and rely on activity monitors associated with an older version of Adobe® Reader® for monitoring functionality of the most recent version, including operations resulting from new features.

According to one embodiment of the disclosure, the use of script 310 may reduce the size of guest images configured with temporary software profiles, which reduces the amount of bandwidth required when the management system 120 is configured to upload these guest images to hundreds, thousands or even tens of thousands of TDPs. Additionally, the amount of local storage within storage device 165 may be reduced, especially when it is storing tens or hundreds of guest images associated with temporary software profiles.

According to another embodiment of the disclosure, in lieu of the script 310 being deployed within the guest image 185, the script 310 may be a deployed within logic within the dynamic analysis engine 170 outside the guest image 185. For instance, the script 310 may be located within a guest image management module (not shown), which receives handle or other information about the new version of the software component to be retrieved and processed within the virtual machine $178_2$.

III. Exemplary Logical Layout

Figure 4:
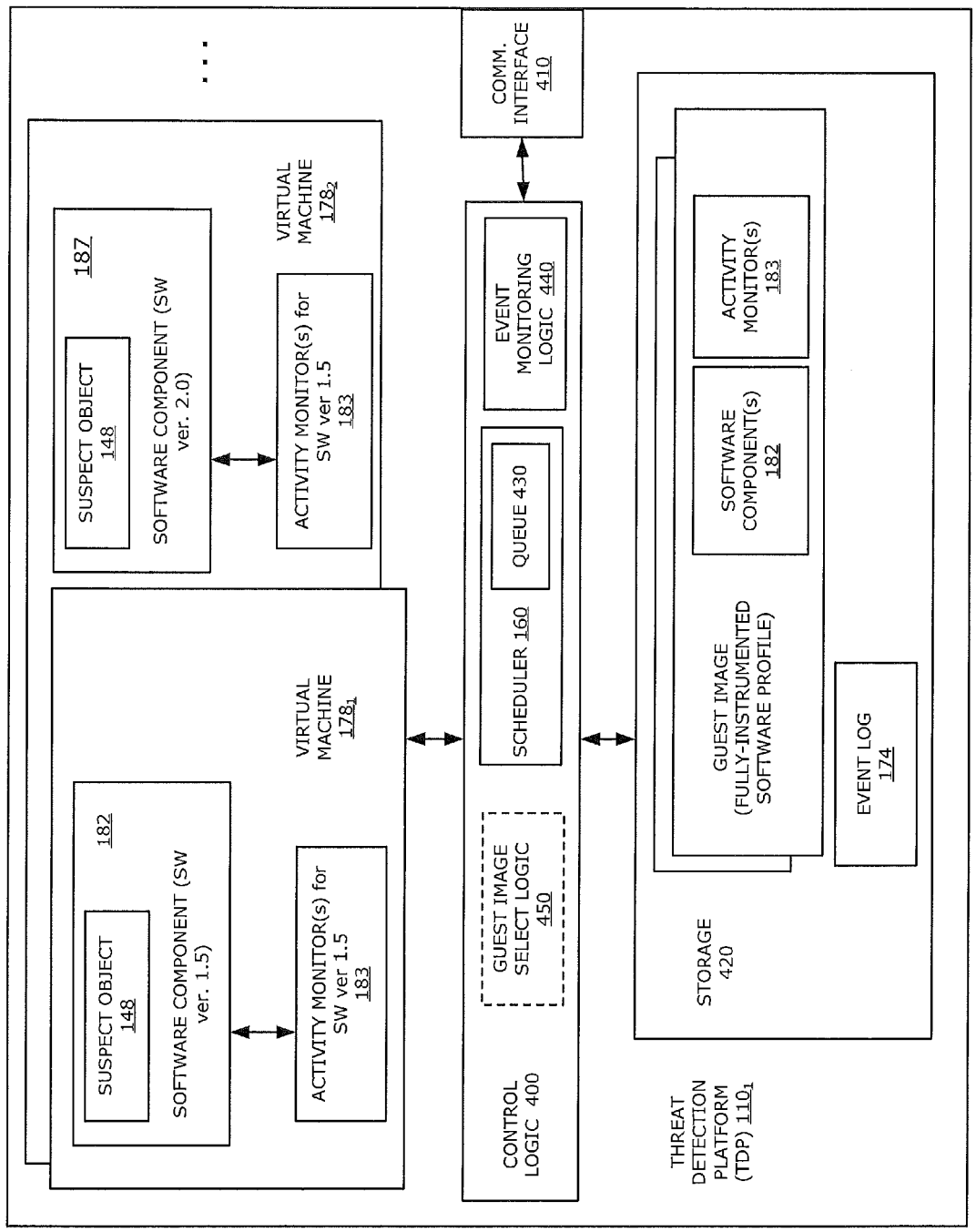
FIG. 4 is an exemplary embodiment of a logical representation of the TDP of FIG. 1.

Referring now to FIG. 4, an exemplary block diagram of logic associated with the first TDP $110_1$ of FIG. 1 is shown. The first TDP $110_1$ includes control logic 400 to manage and control the VMs $178_1$-$178_M$ as independent, sandboxed virtual environments. The behaviors resulting from the processing of the suspect object 148 using the software components 182 and 187 are monitored by the activity monitors 183.

According to a first embodiment of the disclosure, although not shown, the control logic 400 may be implemented as part of a VM monitor or manager (VMM), also referred to as a hypervisor for managing or monitoring VMs, which may be hosted by a host operating system (OS). The VMs $178_1$-$178_M$ may be hosted by a guest OS. The host OS and the guest OS may be the same type of operating systems or different types of operating systems (e.g., Windows™, Linux™, Unix™, Mac OS™, iOS™, etc.), or different versions thereof.

According to a second embodiment of the disclosure, as shown, the control logic 400 may be implemented as processing circuitry that controls, at least in part, the provisioning of the VMs $178_1$-$178_M$ and the processing of the suspect object 148 within the VMs $178_1$-$178_M$. Additionally, the control logic 400 controls, at least in part, the storage of events monitored during the processing of the suspect object 148 by the VMs $178_1$-$178_M$. The monitored events are placed with the event log 174 for subsequent retrieval, processing and reporting of detected malicious and/or non-malicious activities.

According to this second embodiment, when the suspect object 148 is received for a dynamic content analysis via a communication interface 410, the scheduler 160 that is part of the control logic 400 provisions the second VM $178_2$ with a guest image that is in accordance with a temporary software profile to closely simulate a target operating environment (e.g., particular version(s) of certain software installed therein) in which the suspect object 148 is to be analyzed. The temporary software profile includes the newly released version of software 187 (e.g., software ver. 2.0) along with some or all of the activity monitors 183 directed to an earlier version of the software 182 (e.g., software ver. 1.5). Additionally, the scheduler 160 provisions the first VM $178_1$ with a guest image that is in accordance with a fully-instrumented software profile of the earlier version of the software component 182 with its corresponding activity monitors 183.

The scheduler 160 may include a queue 430 of suspect objects awaiting dynamic analysis and processing within a virtual machine because, under heavy workloads, the number of VMs that may be concurrently executed may be limited. The scheduler 160 then launches VMs $178_1$ and $178_2$ in which activity monitors 183 are running within VMs $178_1$ and $178_2$ in order to monitor for anomalous behaviors of the suspect object 148 during processing.

Upon detecting various behaviors, some or all of these behaviors may be sent (via message(s)) to an event monitoring logic 440 within the control logic 400. In communication with the activity monitors 183, the event monitoring logic 440 is configured to capture at least some events from the activity monitors 183 and store these events in the event log 174. These events may be further provided, directly or indirectly, to the classification engine 180 (for applying classification rules to the monitored and stored events (behaviors/activities) to classify the object as malware or benign), and UI rendering engine 190 of FIGS. 1-3.

The messaging between the activity monitors 183 and the control logic 400 for recordation of the events within storage 420, such as part of the event log 174, may be triggered upon detection of one or more anomalous behaviors during processing of the suspect object 148. Examples of these anomalous behaviors may include, but are not limited or restricted to an unexpected activity, an unexpected sequence of activities and/or inactivity, or other behaviors that differ from behaviors representative for this particular software component 182.

The control logic 400 may further include guest image selection (GIS) logic 450. The GIS logic 450 selects, from storage 420, multiple versions of a software application to be used, especially when the suspect object 148 is configured to run on newly released software that has not been instrumented. Under this condition, the GIS logic 450 selects a guest image associated with temporary software profile, which includes a most recent version of the software component 187 that has not been fully-instrumented. The GIS logic 450 further select a guest image associated with a prior version of that software component (e.g., software component 182) that is based on a fully-instrumented software profile. By selecting this software profile combination, the detected behavioral differences may provide information as to whether the suspect object is a zero-day exploit.

IV. Exemplary Logical Operational Flow

Figure 5:
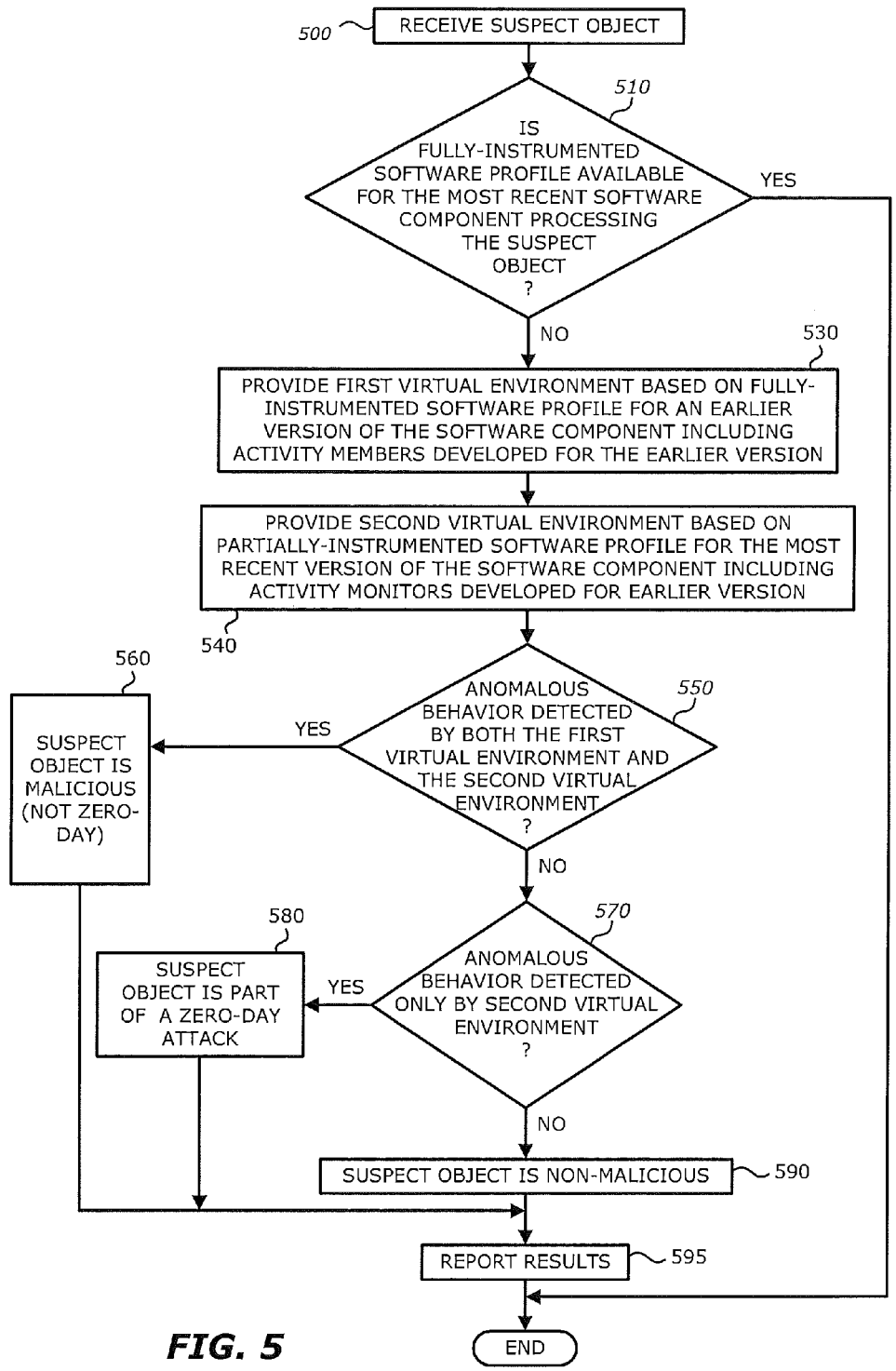
FIG. 5 is an illustrative embodiment of the operations conducted in accordance with the rotating guest image scheme.

Referring now to FIG. 5, an illustrative embodiment for detecting malicious attacks, especially zero-day attacks, prior to completion of a fully-instrumented software profile for a newly released version of a software component is shown. According to this embodiment, in response to receipt of a suspect object and a fully-instrumented software profile for the newly released version of the software component that processes the object is unavailable, collective multiple sandboxed virtual environments are generated to detect zero-day attacks and other malicious attacks (blocks 500, 510 and 520).

In particular, according to one embodiment of the disclosure, upon receipt of the suspect object, a first virtual environment features a first VM that is provisioned with a first guest image for processing the suspect object. The first guest image is configured in accordance with a fully-instrumented software profile of an earlier version of the software component. As part of or provided with the first guest image, activity monitors are developed and tested to detect anomalous behaviors of an object when processed by the earlier version of the software component (block 530).

Additionally, upon receipt of the suspect object, a second virtual environment features a second VM that is provisioned with a second guest image for processing the suspect object. The second guest image is configured in accordance with at most a partially-instrumented software profile of the most recent version of the software component. As part of or provided with the second guest image, some or all of the activity monitors for the earlier version of the software component are used for detecting anomalous behavior (block 540). Of course, it is contemplated that the first and second virtual environments may be associated with a single VM that supports concurrent processing of multiple guest images.

In response to detecting one or more anomalous behaviors by both the first and second virtual environments, a determination is made that that the suspect object is associated with a malicious attack (blocks 550 and 560). However, in response to only the second virtual environment detecting one or more anomalous behaviors, a determination is made that that the suspect object is associated with a particular malicious attack, namely a zero-day attack (blocks 570 and 580). Otherwise, the suspect object is non-malicious (block 590). The results of the determinations are subsequently reported (block 595).

V. Endpoint Device Deployment

This technique for improved zero-day exploit detection and software profile instrumentation also may be performed by one or more security agents (hereinafter "security agent(s)") 600 as shown in FIG. 6. Herein, the security agent(s) 600 is stored within a memory 610 encased within a housing 625 of an endpoint device 620. Upon execution by a processor 630, the security agent(s) 600 conducts dynamic analysis of at least a portion of information 640 received by a transceiver 650 of the endpoint device 620. As described above, the security agent(s) 600 conducts dynamic (virtual) analysis of a suspect object 148 in accordance with the fully-instrumented software profile and a temporary software profile as described above, and monitors the resultant behaviors by the suspect object 148. These monitored behaviors are stored in an event log 660 within the memory 610, which may be reported through a messaging system (not shown) within the endpoint device 620 on a display 670.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A threat detection platform comprising:
a communication interface;
one or more processors coupled to the communication interface; and
a storage device that includes (i) an event log, (ii) a first guest image that is based on a fully-instrumented software profile including a first software component and activity monitors specifically configured to capture data associated with operations for the first software component, (iii) a second guest image that is based on a temporary software profile including a second software component being different from the first software component and the activity monitors specifically configured for the first software component instead of the second software component,
wherein, in response to receipt of an object by the threat detection platform, the one or more processors are configured to provision both a first virtual machine with the first guest image and a second virtual machine with the second guest image to concurrently analyze the object to determine if the object is associated with a malicious attack by at least (1) processing the object by the first virtual machine and monitoring behaviors of the first virtual machine by the activity monitors and (2) processing the object by the second virtual machine and monitoring behaviors of the second virtual machine by the activity monitors.

2. The threat detection platform of claim 1, wherein the first virtual machine is a different virtual machine than the second virtual machine.

3. The threat detection platform of claim 1, wherein the second software component is a more recent version of the first software component.

4. The threat detection platform of claim 1, wherein at least the first virtual machine, the second virtual machine and the activity monitors collectively detect that the object is associated with a zero-day attack, being a particular type of malicious attack, in response to the activity monitors detecting one or more anomalous behaviors being conducted by the second virtual machine during processing of the object while the activity monitors failing to detect any of the one or more anomalous behaviors being conducted by the first virtual machine during processing of the object.

5. The threat detection platform of claim 4, wherein at least the first virtual machine, the second virtual machine and the activity monitors collectively detect that the object is associated with a known type of malicious attack in response to the activity monitors detecting one or more anomalous behaviors being conducted by both the first virtual machine and the second virtual machine during processing of the object.

6. The threat detection platform of claim 4, wherein the communication interface comprises
logic that receives a flow from a remote source, decompresses or decrypts the flow, and extracts an object from the flow;
logic that extracts or generates metadata associated with the object that is subsequently used by the one or more processors in provisioning at least the first virtual machine and the second virtual machine; and
logic that analyzes features of the object to identify the object is suspect when a likelihood of the object being associated with a malicious attack exceeds a threshold.

7. The threat detection platform of claim 6, wherein the remote source is a network and the flow is network content propagating over the network.

8. The threat detection platform of claim 1, wherein the activity monitors for the second guest image is lesser in number that the activity monitors for the first guest image.

9. The threat detection platform of claim 1, wherein in response to receiving a third guest image that is based on a second fully-instrumented software profile including the second software component and activity monitors specifically configured for the second software component prior to receipt of the object, the one or more processors are configured to provision a virtual machine with the third guest image in lieu of provisioning the first virtual machine and the second virtual machine.

10. The threat detection platform of claim 1, wherein the first virtual machine with the first guest image and the second virtual machine with the second guest image continuing to concurrently analyze the object as the activity monitors are updated.

11. The threat detection platform of claim 10, wherein the activity monitors are updated until the second software component is fully instrumented.

12. The threat detection platform of claim 11, wherein, in response the second software component being fully instrumented, discontinuing analysis of the object using the first virtual machine with the first guest image and analyzing the object using the second virtual machine including the fully-instrumented second software component.

13. The threat detection platform of claim 1, wherein the activity monitors being separate from with the second software component.

14. The threat detection platform of claim 13, wherein the second software component being a more recent version of software than the first software component.

15. A threat detection platform comprising:
a communication interface;
one or more processors coupled to the communication interface;
a storage device that includes (i) an event log, (ii) a first guest image that is based on a fully-instrumented software profile including a first software component and activity monitors specifically configured to capture data associated with operations for the first software component, (iii) a second guest image that includes information that causes retrieval of a second software component that is different from and a more recent version of the first software component from a remote source and the activity monitors are specifically configured for the first software component instead of the second software component,
wherein, in response to receipt of an object by the threat detection platform,
the one or more processors are configured to provision a first virtual machine with the first guest image and a second virtual machine with the second guest image that causes subsequent loading of the second software component, and
the first virtual machine and the second virtual machine concurrently analyze the object to determine if the object is associated with a malicious attack by at least (1) processing the object by the first virtual machine and monitoring behaviors of the first virtual machine by the activity monitors and (2) processing the object by the second virtual machine and monitoring behaviors of the second virtual machine by the activity monitors.

16. The threat detection platform of claim 15, wherein the first virtual machine is a different virtual machine than the second virtual machine.

17. The threat detection platform of claim 15, wherein at least the first virtual machine, the second virtual machine and the activity monitors collectively detect that the object is associated with a zero-day attack, being a particular type of malicious attack, in response to the activity monitors detecting one or more anomalous behaviors being conducted by the second virtual machine during processing of the object while the activity monitors failing to detect any of the one or more anomalous behaviors being conducted by the first virtual machine during processing of the object.

18. The threat detection platform of claim 17, wherein at least the first virtual machine, the second virtual machine and the activity monitors collectively detect that the object is associated with a known type of malicious attack in response to the activity monitors detecting one or more anomalous behaviors being conducted by both the first virtual machine and the second virtual machine during processing of the object.

19. The threat detection platform of claim 15, wherein the communication interface comprises
logic that receives a flow from a remote source, decompresses or decrypts the flow, and extracts an object from the flow;
logic that extracts or generates metadata associated with the object that is subsequently used by the one or more processors in provisioning at least the first virtual machine and the second virtual machine; and
logic that analyzes features of the object to identify the object is suspect when a likelihood of the object being associated with a malicious attack exceeds a threshold.

20. The threat detection platform of claim 19, wherein the remote source is a network and the flow is network content propagating over the network.

21. The threat detection platform of claim 15, wherein in response to receiving a third guest image that is based on a second fully-instrumented software profile including the second software component and activity monitors specifically configured for the second software component prior to receipt of the object, the one or more processors are configured to provision a virtual machine with the third guest image to analyze the object in lieu of provisioning the first virtual machine and the second virtual machine for analyzing the object.

22. A computerized method comprising:
receiving an object for analysis;
provisioning a first virtual machine with a first guest image that is based on a fully-instrumented software profile including a first software component and activity monitors specifically configured for the first software component;
provisioning a second virtual machine with a second guest image that is based on a temporary software profile including a second software component being different from the first software component and the activity monitors specifically configured to capture data associated with operations for the first software component instead of the second software component; and
concurrently analyzing the object by the first virtual machine and by the second virtual machine to determine whether the object is associated with a zero-day attack in response to detecting one or more anomalous behaviors by the second virtual machine upon processing of the object without experiencing one or more anomalous behaviors by the first virtual machine upon processing of the object,
wherein the concurrent analysis of the object by the first virtual machine and the second virtual machine comprises (1) processing the object by the first virtual machine and monitoring behaviors of the first virtual machine by the activity monitors and (2) processing the object by the second virtual machine and monitoring behaviors of the second virtual machine by the activity monitors.

23. The method of claim 22, wherein:
a number of the activity monitors associated with the second guest image is lesser than or equal to a number of the activity monitors associated with the first guest image, and
the second software component is a subsequent version of the first software component.

24. The method of claim 22, wherein the second software component included in the second guest image is a newer version of the first software component included in the first guest image.

25. The method of claim 22, wherein the analyzing of the object by the first virtual machine comprises processing the object with the first virtual machine by a provisioned software application controlled by an operating system being part of the first guest image.

26. The method of claim 22, wherein the provisioning of the first virtual image is based, at least in part, on metadata associated with the object, the metadata being received with the object extracted from network traffic propagating over a network.

27. The method of claim 22, wherein the first virtual machine is provisioned by a scheduler that selects the first guest image based on metadata accompanying the object.

28. The method of claim 22, wherein the concurrent analysis of the object by the first virtual machine with the first guest image and the second virtual machine with the second guest image continues as the activity monitors are updated.

29. The method of claim 28, wherein the activity monitors are updated until the second software component is fully instrumented.

30. The method of claim 29 further comprising:
in response the second software component being fully instrumented, discontinuing analysis of the object using the first virtual machine with the first guest image; and
analyzing the object using the second virtual machine including the fully-instrumented second software component.

31. The method of claim 22, wherein the activity monitors being separate from with the first software component and the second software component.

32. The method of claim 31, wherein the second software component being a more recent version of software than the first software component.

* * * * *